United States Patent
Aykol et al.

(10) Patent No.: US 11,555,859 B2
(45) Date of Patent: Jan. 17, 2023

(54) VEHICLE BATTERY ANALYSIS SYSTEM

(71) Applicant: Toyota Research Institute, Inc., Los Altos, CA (US)

(72) Inventors: Muratahan Aykol, San Jose, CA (US); Chirranjeevi Balaji Gopal, San Jose, CA (US); Patrick K. Herring, Mountain View, CA (US); Abraham S. Anapolsky, San Mateo, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 21 days.

(21) Appl. No.: 17/017,016

(22) Filed: Sep. 10, 2020

(65) Prior Publication Data
US 2022/0074993 A1    Mar. 10, 2022

(51) Int. Cl.
| | | |
|---|---|---|
| *G01R 31/367* | (2019.01) | |
| *B60L 58/10* | (2019.01) | |
| *G01R 31/392* | (2019.01) | |
| *G01R 31/00* | (2006.01) | |
| *G01R 31/374* | (2019.01) | |
| *G06F 30/15* | (2020.01) | |

(52) U.S. Cl.
CPC ............ *G01R 31/367* (2019.01); *B60L 58/10* (2019.02); *G01R 31/007* (2013.01); *G01R 31/374* (2019.01); *G01R 31/392* (2019.01); *G06F 30/15* (2020.01)

(58) Field of Classification Search
None
See application file for complete search history.

(56) References Cited

U.S. PATENT DOCUMENTS

| | | | |
|---|---|---|---|
| 9,897,664 B2 | 2/2018 | You et al. | |
| 2008/0232681 A1* | 9/2008 | Feris ................. | G06K 9/6228 |
| | | | 382/159 |
| 2010/0324848 A1 | 12/2010 | Cho et al. | |
| 2012/0296514 A1 | 11/2012 | Sohmshetty et al. | |
| 2015/0046060 A1 | 2/2015 | Nikovski et al. | |
| 2015/0046109 A1* | 2/2015 | Miwa .................. | G01R 31/3646 |
| | | | 702/63 |
| 2017/0003352 A1 | 1/2017 | Barre et al. | |
| 2018/0164794 A1* | 6/2018 | Nikovski ........... | G05B 23/0205 |

(Continued)

OTHER PUBLICATIONS

Ye et al., "Time Series Shapelets: A New Primitive for Data Mining," KDD '09: Proceedings of the 15th ACM SIGKDD International Conference on Knowledge Discovery and Date Mining, 9 pages (2009).

*Primary Examiner* — Brent A. Fairbanks
(74) *Attorney, Agent, or Firm* — Christopher G. Darrow; Darrow Mustafa PC (57) ABSTRACT

In one embodiment, a vehicle battery diagnostics system forecasts a future state for a battery by monitoring, over a period of time, one or more of voltage, current or temperature signals from at least one battery of the vehicle, storing information from the voltage, current or temperature signals as time-series data, obtaining a forecasting model from a server, the forecasting model indicating at least one shapelet feature that corresponds to a forecast categorization, identifying, in the time-series data, a shapelet that matches the at least one shapelet feature to a degree exceeding a predetermined similarity threshold, and providing a notification indicating the forecast categorization.

20 Claims, 6 Drawing Sheets

(56) References Cited

U.S. PATENT DOCUMENTS

2019/0187212 A1   6/2019  Garcia et al.
2020/0055421 A1*  2/2020  Sastinsky ................ G06F 9/451
2020/0164763 A1*  5/2020  Holme .................... B60L 58/10

* cited by examiner

VEHICLE BATTERY ANALYSIS SYSTEM

TECHNICAL FIELD

The subject matter described herein relates, generally, to systems and methods for monitoring and analyzing a vehicle battery, and more particularly, to systems and methods that use shapelets to forecast classifications such as second life potential and/or anomalous behavior for a vehicle battery.

BACKGROUND

Conventional vehicle battery maintenance technology includes systems that monitor state-of-health or state-of-charge (SOC) over time, voltage over time, current over time, temperature over time, or the like. These vehicle signals are typically processed and correlated for diagnostic analysis, but can be subject to high noise. Improvements in the collection of usable data and data processing are needed for forecasting of battery potential for future states, such as second-life applications or anomalous behavior.

SUMMARY

The disclosed apparatuses, methods and systems relate to a vehicle battery diagnostics system that can forecast a future performance capacity of a battery.

In one embodiment, the disclosed vehicle battery diagnostics system includes a communication device configured to wirelessly transmit data to a server and receive data from the server, and includes one or more processors. The system further includes a memory communicably coupled to the one or more processors and storing: a monitoring module including instructions that when executed by the one or more processors cause the one or more processors to monitor, over a period of time, one or more of voltage, current or temperature signals from at least one battery of the vehicle and store information from the voltage, current or temperature signals as time-series data, a forecast module including instructions that when executed by the one or more processors cause the one or more processors to obtain a forecast model from the server, the forecast model indicating at least one shapelet feature that corresponds to a forecast categorization, and a classifier module including instructions that when executed by the one or more processors cause the one or more processors to identify, in the time-series data, a shapelet that matches the at least one shapelet feature to a degree exceeding a predetermined similarity threshold, and to provide a notification indicating the corresponding forecast categorization.

In one embodiment, a method of diagnosing a battery for a vehicle includes monitoring, over a period of time, one or more of voltage, current or temperature signals from the battery of the vehicle, storing information from the voltage, current or temperature signals as time-series data, obtaining a forecast model from a server, the forecast model indicating at least one shapelet feature that corresponds to a forecast categorization, identifying, in the time-series data, a shapelet that matches the at least one shapelet feature to a degree exceeding a predetermined similarity threshold, and providing a notification indicating the forecast categorization.

In one embodiment, a non-transitory computer-readable medium for diagnosing a battery for a vehicle, includes instructions that, when executed by one or more processors, cause the one or more processors to monitor, over a period of time, one or more of voltage, current or temperature signals from the battery of the vehicle, store information from the signals as time-series data, obtain a forecast model from a server, the forecast model indicating at least one shapelet feature that corresponds to a forecast categorization, identify, in the time-series data, a shapelet that matches the at least one shapelet feature to a degree exceeding a predetermined similarity threshold, and provide a notification indicating a prediction of the corresponding forecast categorization.

In one or more embodiments, the training of models and discovery of informative shapelets is a process that takes place in a server using data specifically generated in a laboratory (i.e., lab data) by systematically cycling cells analogous to those in the vehicle under various conditions and determination of their performance deterioration.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a vehicle battery diagnostics system are disclosed. As electric vehicles (EV) and hybrid vehicles (HV) become more popular and widespread, the number of used batteries spent by such vehicles will correspondingly increase. Handling increasing numbers of used batteries presents a challenge, as they cannot be disposed of like ordinary waste due to their chemical composition and environmental concerns. While special disposal or dismantling is one option, many used vehicle batteries are still suitable for use in a different context, commonly referred to as a "second life" for a vehicle battery.

For example, a typical EV or HV may require a battery to be capable of maintaining 80 percent of its total usable capacity and achieve a resting self-discharge rate of only about 5 percent over a 24-hour period. After a battery's performance falls below these standards, the battery may still be capable of storing charge sufficient for less-demanding applications, such as stationary energy-storage services. There are many such energy-storage applications for which a second-life battery is a viable, low-cost solution. Furthermore, the utility of a second-life battery can extend over a relatively long period of time, as the battery may still be capable of functioning for several hundred cycles.

It is therefore valuable to accurately identify batteries that have significant second-life potential and likewise identify batteries that are unsuitable for second-life applications and can be properly disposed of immediately. However, such identification may be difficult since vehicle use cycle patterns and operating environments vary widely and batteries experience different levels or types of degradation. Furthermore, vehicle batteries may have performance related issues, not apparent upon conventional inspection, that render the battery unsuitable for a second life use, such as internal damage or anomalous behavior that is not immediately detected.

Conventional techniques that measure (or infer from measured signals) attributes, such as state-of-charge and state-of-health are not suitable for forecasting a battery's future performance capacity (e.g., for a second life application) or detecting anomalous behaviors that are indicators of unsuitability for long-term or second-life use. Accordingly, the disclosed embodiments provide systems and methods that identify and use "shapelets" to forecast a battery's future performance capacity with a high degree of accuracy. The disclosed embodiments can identify vehicle batteries that have a potential for second-life use. Moreover, the disclosed embodiments can identify latent anomalous behavior/traits that may render a battery unsuitable for second life use, or even unsuitable for normal long-term use.

"Shapelets," as referred to herein, are short sub-time series of signals which may have a fixed length and can capture information in time-series data by disentangling a particularly informative signal or feature from noise that may be present in a set of the time-series data. Generally, a shapelet may be a continuous or patterned signal data.

The disclosed embodiments include a modeling system that creates forecast models, that incorporate informant shapelets identified from lab-based data and/or field-based data, and a battery diagnostics system that generates forecasts for a given battery based on a selected forecast model. In one or more embodiments, the modeling system can create various types of forecast models, for example, according to specific contextual parameters such a battery type, a vehicle type, a primary use case of the vehicle, etc. Thus, a battery diagnostics system can obtain one or more forecast models per context as appropriate.

Lab-based data as used herein refer to time-series data obtained from batteries while emulating driving conditions under controlled environments. Field-based data as used herein refer to data obtained from batteries in vehicles that are in some form of actual use (e.g., a vehicle fleet, participating customer vehicles, or the like). Accordingly, one or more embodiments can include reading time-dependent current, voltage, and/or temperature signals from one or more battery cells during lab controlled cycling operations as well as from one or more battery cells from a plurality of vehicles during actual operation over a period of time and combining the two signal sets to form a broad, representative time-series data set.

In one or more embodiments, the lab-based data may be labeled according to the results of the battery upon completion of the emulation cycles while the field-based data may be unlabeled. Both the labeled and unlabeled data can be combined in the shapelet discovery process. In one or more embodiments, information gain metrics can be used to search the combined data and discover the N best shapelets that can classify inputs into two or more forecast classes. This operation can be performed in an unsupervised manner or can be coupled with supervised training (e.g., by finding shapelets that can deliver the highest predictive performance for second-life categorization). One or more embodiments include other ways of exploiting the time-series data, such as searching for intervals of occurrence of same or different shapelets of a given signal type (e.g., voltage) or cross-correlation between shapelets of two variables (e.g., voltage and current), as will be discussed further below.

One or more of the disclosed embodiments utilize algorithms or models to identify informant shapelets in a supervised manner. The supervised algorithms can include, for example, linear models, logistic regression, a neural network, a Gaussian process, or a random forest type classification.

One or more of the disclosed embodiments include training forecast models for classifying battery cells, for example, as performant or sub-par, based on informant shapelets. Forecast models may also be trained to classify battery cells for other predictive or prognostics tasks, for example, by using quantities extracted from the presence of shapelets in labeled battery time-series data that indicate performant or sub-par battery cells. Furthermore, forecast models can be created/trained for varying contexts, products and use cases.

Trained forecast models can be deployed in vehicles, where incoming segments of time-series data read from the vehicle battery pack are compared and/or measured against sequences of extracted shapelets to continuously determine forecast classifications (e.g., second-life or other prognostics) in real-time. The disclosed embodiments can record and share forecast information with the driver, allowing advance planning for battery servicing or intelligent cell-level load adjustments to lengthen battery life.

In one or more embodiments, classifiers with probabilistic interpretation can be interpreted to provide likelihood estimations for sub-par second-life and can be used to raise a flag if a likelihood of a certain event rises above a predetermined threshold. Patterns traced in the most important shapelets in predictive models can inform researchers with understanding or helping with interpreting possible underlying root causes such as lithium (Li)-inventory loss, delamination, active material loss, etc.

Figure 1:
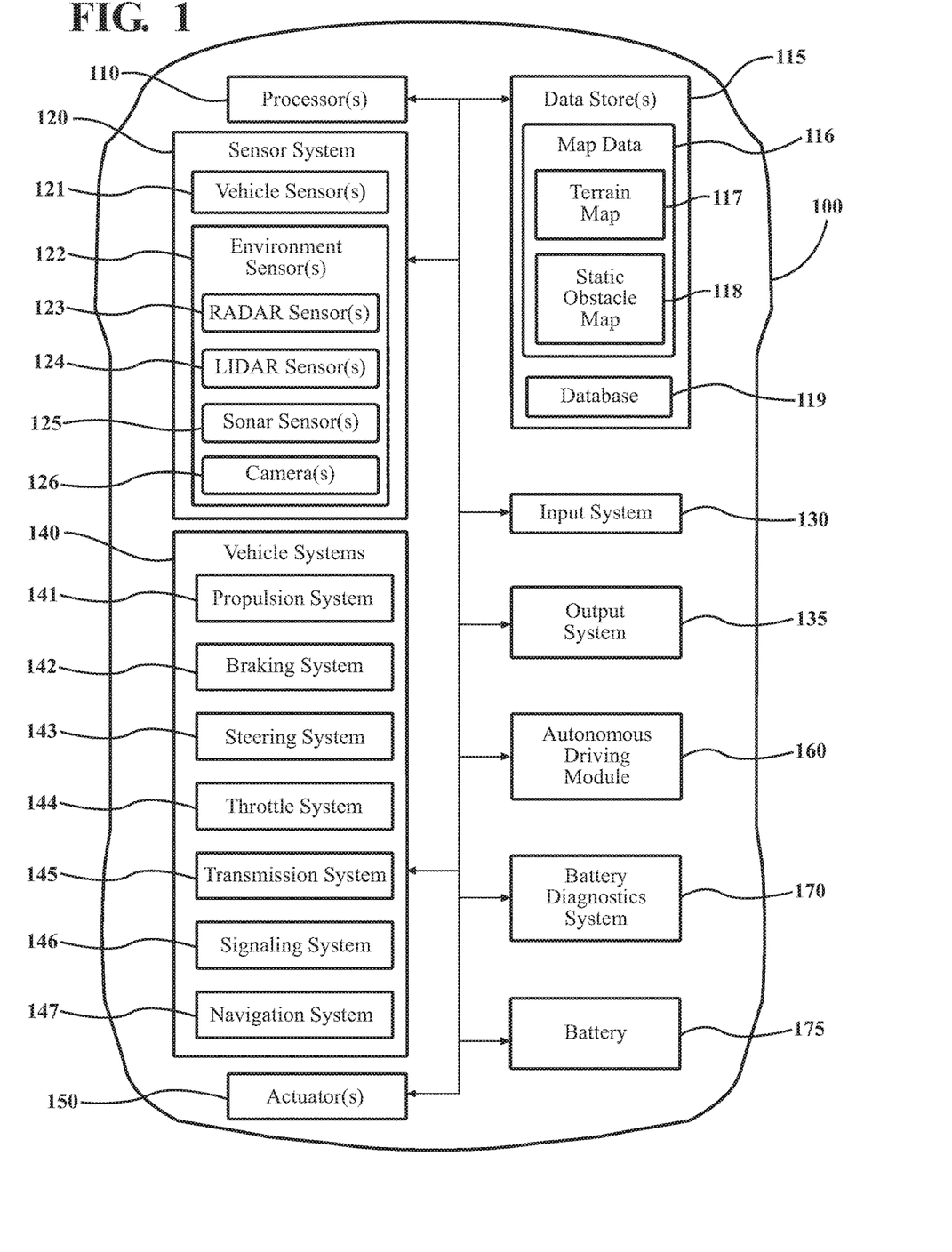
FIG. 1 illustrates one embodiment of a vehicle within which embodiments disclosed herein may be implemented.

Referring to FIG. 1, an example of a vehicle 100 is illustrated. As used herein, a "vehicle" is any form of transport that is used for moving people, animals, goods, or the like. In one or more implementations, the vehicle 100 is an automobile. While arrangements will be described herein generally with respect to automobiles, it should be understood that the scope of the disclosed subject matter is not limited to automobiles. In some implementations, the vehicle 100 may be any form of powered, multi-wheeled transport or vehicle that may include a battery and thus can benefit from the functionality discussed herein.

As shown in FIG. 1, the vehicle 100 includes multiple elements. It should be understood that in various embodiments the vehicle 100 may not necessarily include all of the elements shown in FIG. 1. The vehicle 100 can have any combination of the various elements shown in FIG. 1. Further, the vehicle 100 can have other elements in addition to those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-6 for purposes of brevity in this description. For simplicity and clarity of illustration, where appropriate, reference numerals have been repeated among the different figures to indicate corresponding or analogous elements. In addition, while the discussion outlines numerous specific details to provide a thorough understanding of the embodiments described herein, those of ordinary skill in the art will understand that the embodiments described herein may be practiced using various combinations of these elements.

In any case, the vehicle 100 includes a battery diagnostics system 170 that is implemented to perform methods and other functions as disclosed herein relating to monitoring and diagnosing at least one battery 175 of the vehicle 100. The noted functions and methods will become more apparent in the following discussion of the figures.

Figure 2:
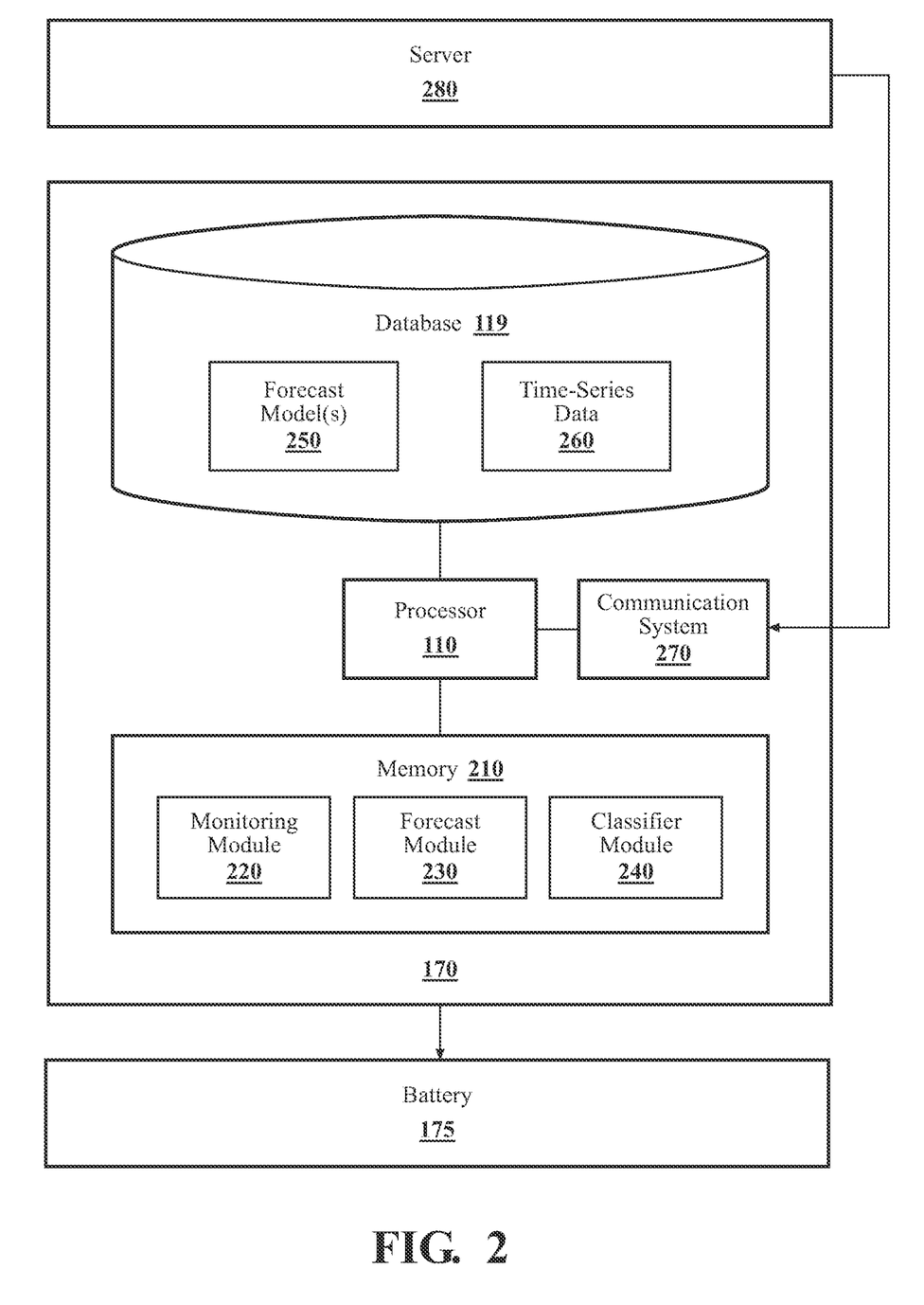
FIG. 2 illustrates one embodiment of a vehicle battery diagnostics system according to the disclosed subject matter.

With reference to FIG. 2, one embodiment of an implementation of the battery diagnostics system 170 of FIG. 1 is illustrated. The battery diagnostics system 170 can be communicably connected to a battery 175, which may be a single battery or a battery pack and which may be the target of forecast diagnosis. In one or more embodiments, the battery diagnostics system 170 is communicably connected to an external server 280, for example, to receive forecast models from and/or to transmit time-series data to.

The battery diagnostics system 170 is shown as including a processor 110 and database 119 from the vehicle 100 of FIG. 1. Accordingly, the processor 110 may be a part of the battery diagnostics system 170, the battery diagnostics system 170 may include a processor separate from the processor 110 of the vehicle 100 or the battery diagnostics system 170 may access the processor 110 through a data bus or another communication path.

The battery diagnostics system 170 includes a database 119 that stores, among other things, one or more forecast models 250 and time-series data 260 (e.g., measured voltage, current and/or temperature signal values obtained from the battery 175), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the battery diagnostics system 170, in one or more embodiments, includes a memory 210 that stores a monitoring module 220, a forecast module 230, and a classifier module 240. The memory 210 can be constructed as a random-access memory (RAM), read-only memory (ROM), a hard-disk drive, a flash memory, or other suitable memory for storing the modules 220, 230 and 240.

The battery diagnostics system 170 can also include a communication system 270 that allows the battery diagnostics system 170 to receive model data and communicate with, for example, communication networks, server systems, and other systems. The communication system 270 can be implemented, for example, as a wireless communication system including one or more transmitting/receiving devices, one or more transmitting/receiving antennas and a controller for transmitting and receiving data over a wireless network using any of a variety of protocols, such as vehicle-to-everything (V2X), general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), Wibree, and/or any other wireless protocol. In one or more embodiments, the communication system 270 can be configured to receive, for example, forecast models 250 from one or more external entities, such as server 280 which may be a cloud server, edge server, etc.

The modules 220, 230 and 240 are, for example, constructed as computer-readable instructions that when executed by the processor 110 cause the processor 110 to perform the various functions disclosed herein.

The monitoring module 220 is generally constructed including instructions that function to control the processor 110 to monitor, over a period of time, one or more of voltage, current or temperature signals from the battery 175 and store information from the signals as time-series data 260.

The forecast module 230 is generally constructed including instructions that function to control the processor 110 to obtain one or more forecast models 250 from the server 280 and store the forecast model(s) 250 in the database 119. For example, the server 280 may store multiple types of forecast models 250 corresponding to different contexts, such as battery model, vehicle make/model/year, environmental characteristics, use characteristics, etc., as will be discussed further below. Each forecast model 250 indicates at least one shapelet feature that corresponds to a forecast categorization, such as second life categorization or an anomalous behavior categorization. In one or more embodiments, the forecast module 230 can request a forecast model 250 with one or more contextual parameters according to a current context of the vehicle 100 and/or the battery 175.

The classifier module 240 is generally constructed including instructions that function to control the processor 110 to identify, in the time-series data 260, a shapelet that matches a shapelet feature indicated by the forecast model 250 to a degree exceeding a predetermined similarity threshold, and to provide a notification indicating a forecast categorization determined based on the forecast model 250. For example, in one implementation the classifier module 240 can scan segments of temperature data stored in time-series data 260 searching for any of a set of shapelets (or shapelet features, as discussed below) indicated in a forecast model 250 that corresponds to a performance categorization. When the classifier module 240 identifies shapeletes/features in the time-series data 260 that match the shapelets/features indicated in the forecast model 250 beyond a threshold amount, the classifier module 240 can determine a forecast based on one or more aspects of the identified shapelets/features and transmit a forecast notification (e.g., to a user interface of the vehicle 100 or to a network connected computing device) to provide notice of the current forecast.

Figure 3:
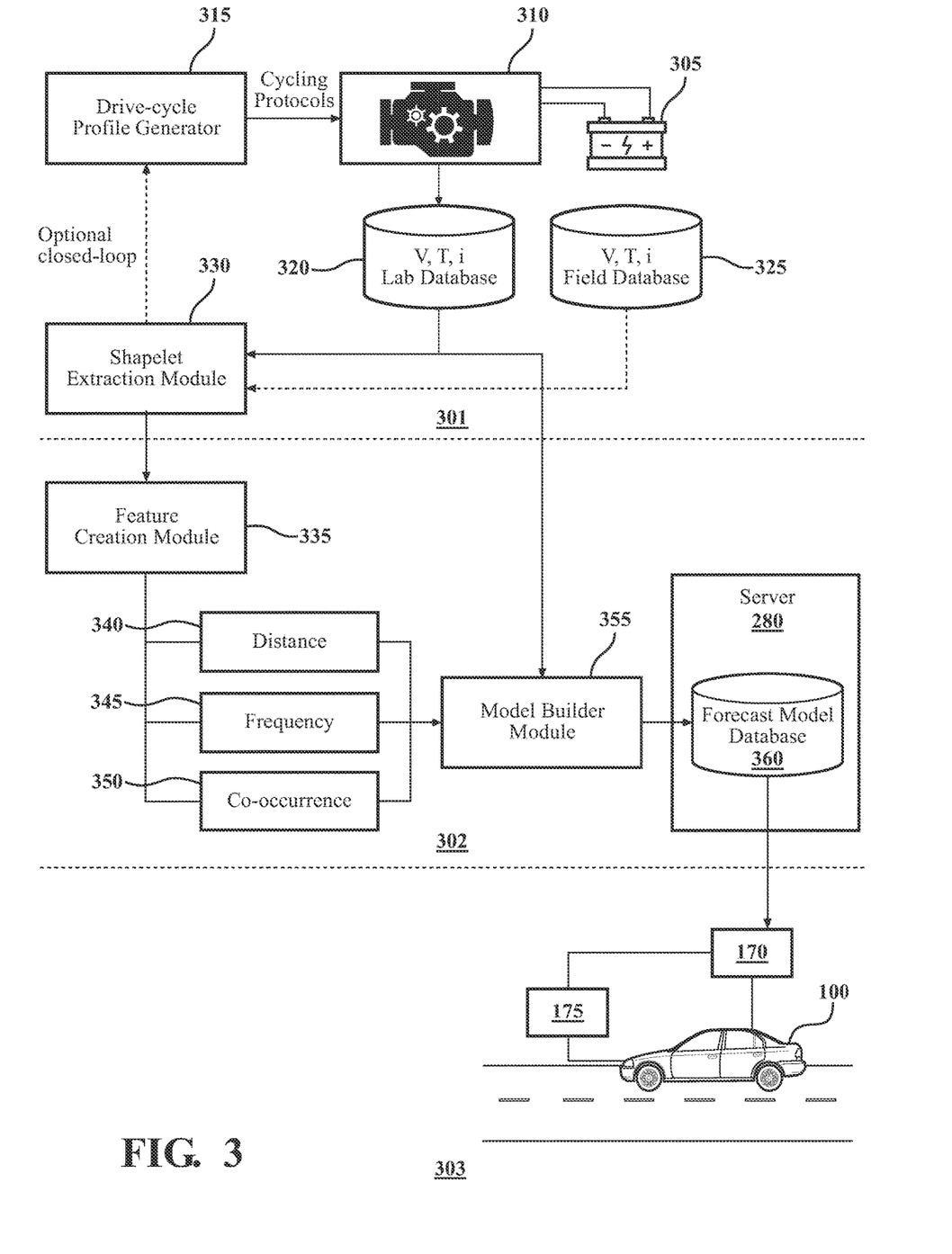
FIG. 3 illustrates example lab-based production phases according to the disclosed subject matter.

FIG. 3 shows an example of lab-based production phases 301, 302, for creating forecast models and providing the forecast models to vehicles, e.g., vehicle 100, in a deployment phase 303.

A first production phase 301 executes a shapelet identification process. In this phase, a battery 305 (or multiple batteries) is connected to lab-controlled cycling equipment 310. The cycling equipment 310 can be configured to emulate different types of driving conditions and driving patterns that the battery 305 conceivably would encounter in actual use. The cycling equipment 310 can further be configured to emulate specific characteristics and traits of individual vehicle models. For example, in one hypothetical implementation the cycling equipment 310 can be configured to emulate a car, Model A, sold by Manufacturer B in 2020, by emulating specific aspects of the Model A as it relates to systems that interact with the battery 305, such as engine power, power draw from other vehicle systems, etc.

The contextual and vehicular emulation parameters may be collectively referred to as a drive-cycle profile. The cycling equipment 310 can receive one or more drive-cycle profiles from a drive-cycle profile generator 315, which is capable of generating a plurality of different types of drive-cycle profiles.

Based on the drive-cycle profiles, the cycling equipment 310 can continuously cycle the battery 305 through one or more load patterns that emulate vehicle use until the battery 305 reaches a performance failure threshold at which it can no longer adequately power the emulation cycles. The cycling equipment 310 can record signals (e.g., temperature, voltage, current) obtained from the battery 305 while cycling as time-series data in a lab database 320. When the battery 305 reaches the performance failure threshold, the battery 305 can be tested for one or more performance classifications, such as second life applications suitability, and time-series data associated with the battery 305 can be labeled with one or more labels according to the results.

For example, if after reaching the performance failure threshold the battery 305 nevertheless remains capable of maintaining 50 percent of its total usable capacity and achieving a resting self-discharge rate of about 15 percent over a 24-hour period, the time-series data associated with the battery 305 may be labeled as appropriate for a stationary storage second life application. Multiple labels may be associated with the battery 305 corresponding to different second life applications having performance requirements that the battery 305 meets or exceeds.

Likewise, if the battery 305 fails to meet performance requirements for any second life application or otherwise fails during the drive-cycles (e.g., fails to perform long enough to reach the performance failure threshold), the time-series data associated with the battery 305 can be labeled according to the type of failure. For example, if the battery 305 fails after 1,000 cycles where similar batteries perform for 5,000 cycles before reaching the performance failure threshold, the time-series data can be labeled as "1,000 cycle failure" data.

The shapelet extraction module 330 analyzes the time-series data stored in the lab database 320 to extract one or more shapelets that are informative regarding the time-series data for the battery 305. In one or more embodiments, information gain metrics can be used to search and find the N best shapelets that can classify the obtained time-series data into two or more classes. This step can be performed in a supervised manner or can be coupled with unsupervised training. In one or more embodiments the shapelet extraction module 330 can combine the analysis results with unsupervised methods based on information gain. For example, to increase information gain in finding shapelets the shapelet extraction module 330 can utilize field data (i.e., unlabeled) obtained from a field database 325 that receives times-series data in real-time from vehicles still in operation.

Figure 4:
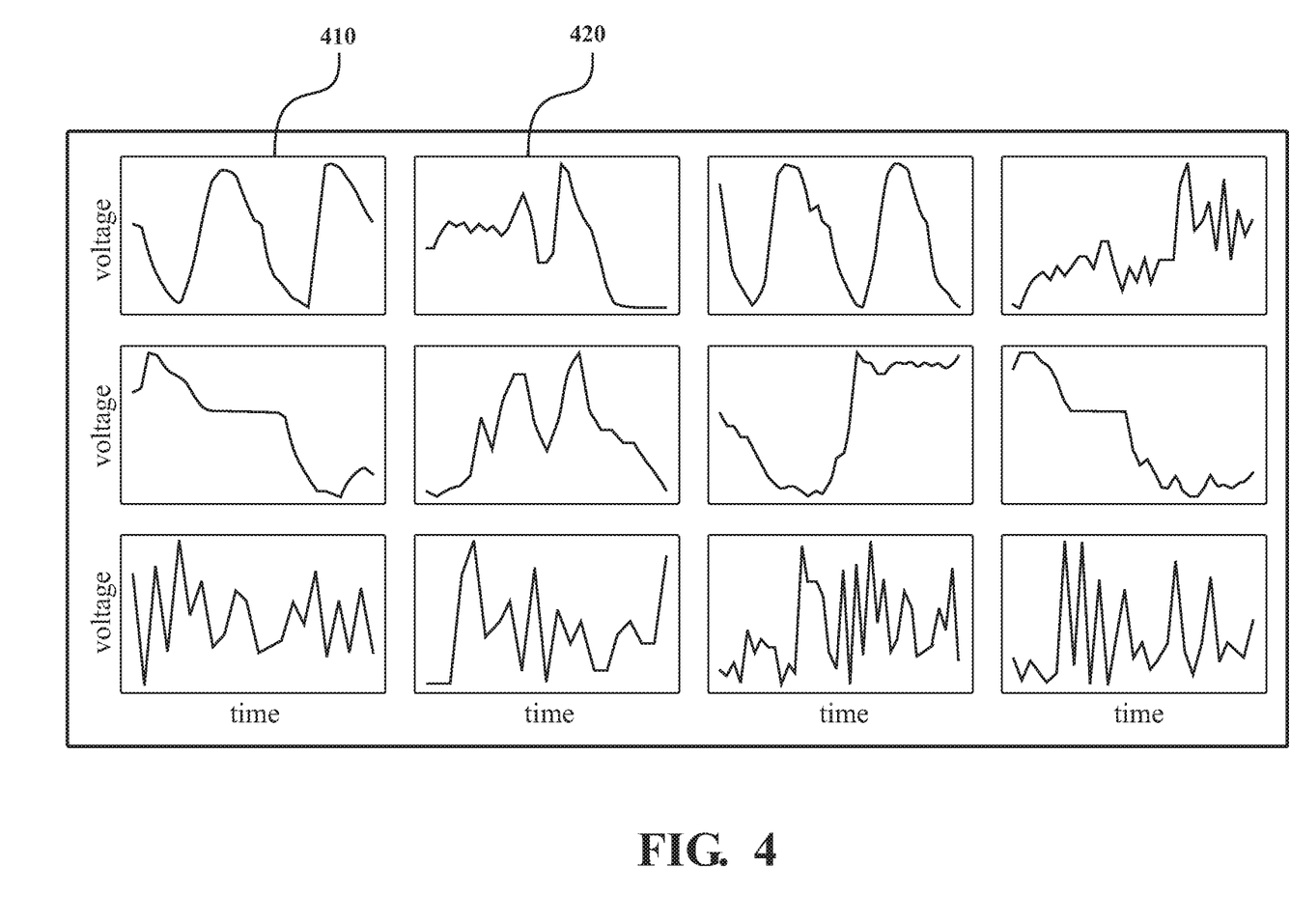
FIG. 4 illustrates an example set of extracted shapelets according to the disclosed subject matter.

FIG. 4 shows an example set of twelve shapelets extracted from synthetic drive-cycle battery data for second-life forecasting, ordered from most-informative (top-left) to least (bottom-right). A first shapelet 410 may be a most informative shapelet, a second shapelet 420 may be next most informative, and so on. While the example set refers to second-life forecasting, it should be clear that the shapelet extraction module 330 can extract sets of shapelets for other forecasting classifications, such as variations of anomalous behavior forecasting or performance capacity projections.

Referring back to FIG. 3, in one or more embodiments, the shapelet extraction module 330 can be communicatively connected to the drive-cycle profile generator 315 in a "closed-loop" to facilitate iterative experimental design, using the performance of predictions from as-extracted shapelets to determine algorithmically which new experiments should be implemented (i.e., under what conditions) by the cycling equipment 310 to obtain more informative shapelets. In this manner the drive-cycle profile generator 315 can adjust the drive-cycle profiles to diversify the extracted shapelets.

In the second production phase 302, the feature creation module 335 receives the extracted shapelets and determines enhanced shapelet features based on information derived from the extracted shapelets. For example, the enhanced shapelet features can include distance metrics 340, frequency metrics 345 (e.g., indicating how frequently a given shapelet occurred in a certain time segment), co-occurrence metrics 350 (e.g., indicating how often two or more shapelets co-occurred in a certain time segment), etc.

The model builder module 355 aggregates the enhanced shapelet features to generate one or more forecast models to be stored in a forecast model database 360, which may be accessible via a server 280. The model builder module 355 can further train and tune the forecast models for specific purposes using labeled time-series data from the lab database 320 as training data. For example, the model builder module 355 can build a first forecast model specifically to forecast performance classifications (e.g., second life application, anomalous behavior such as early failure, etc.) for a hypothetical battery Type X installed in a Model A vehicle operating primarily in a highway context (i.e., continual, long distance travel), a second forecast model specifically to forecast performance classifications for the battery Type X installed in a Model A vehicle operating primarily in an urban context (i.e., short trips, frequent stop and go use), and so on. The model builder 355 can build forecast models of varying degrees of specificity and granularity depending on available data.

In one or more embodiments, a completed forecast model can receive segments of time-series data as input and attempt to output a forecast performance classification. For example, the forecast model can include multiple sets of shapelet features, each corresponding to different performance classifications, and compare the input segments of time-series data against the shapelet features to search for a match.

In one or more embodiments, the forecast model can quantify a strength of a match between an input segment and a shapelet, for example, based on distance between points on the input segment and points on the shapelet. If a given segment does not contain a match that exceeds a similarity threshold (e.g., a minimum sum distance value), the forecast is indeterminate based on that segment. If a match that exceeds the similarity threshold (e.g., exceeds the minimum sum distance value) is found for a given segment, the forecast model can determine that the match indicates the corresponding performance classification.

In some cases a single match may be insufficient for a forecast model to determine a forecast. In one or more implementations, the forecast model can affirmatively determine a forecast when identified matches for a classification exceeds a forecast threshold (e.g., based on one or more of match quantity and match quality metrics). In one or more implementations, the forecast model can further determine a forecast and a confidence level of a forecast based on other shapelet-based metrics, such as frequency of occurrence of model shapelet features, co-occurrence of model shapelet features, and time distance between model shapelet features. In one or more implementations, a forecast model can further train a supervised machine learning model, such as a linear model, logistic regression, a neural network, a Gaussian process, or a random forest, that may use the multiple shapelet metrics described above as input features to provide the forecast.

At phase 303, the disclosed battery diagnostics system 170 obtains a forecast model 250 from the forecast model database 360 according to current contextual parameters (e.g., battery type, vehicle module, primary use case, etc.) associated with the vehicle 100. The battery diagnostics system 170 monitors and stores signals (e.g., voltage, current, or temperature) from the battery 175 as time-series data 260. The battery diagnostics system 170 inputs segments of the time-series data 260 from the battery 175 into the forecast model 250, which in turn can generate a forecast performance classification for the battery 175.

The battery diagnostics system 170 can periodically generate forecasts for the battery 175 over time. The forecasts can dynamically change, for example, if the battery 175 receives internal or external damage that affects performance. The battery diagnostics system 170 can provide a notification of when a forecast is generated, thereby keeping the driver informed of the future use potential of the battery 175.

Figure 5:
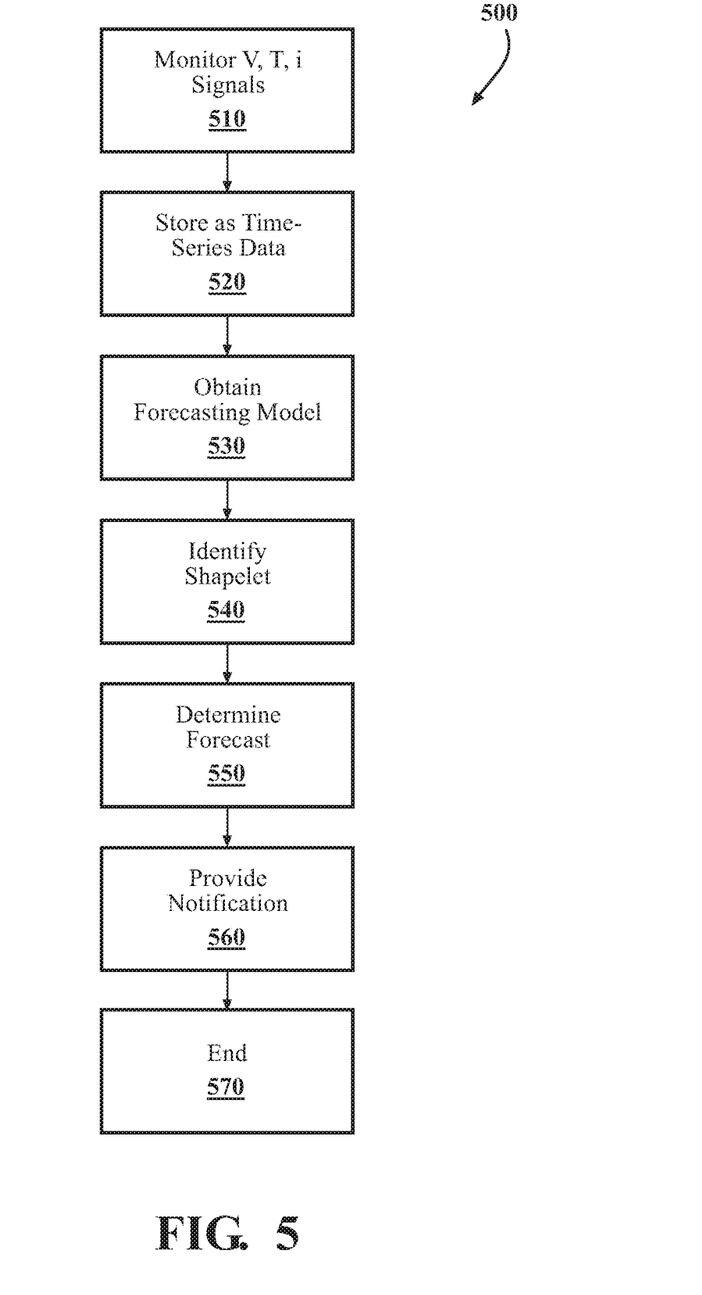
FIG. 5 illustrates a method of operating an embodiment of a vehicle battery diagnostics system according to the disclosed subject matter.

Additional and optional features of the battery diagnostics system 170 will now be discussed. FIG. 5 illustrates a flowchart of a method 500 of diagnosing a battery 175 to determine a performance forecast according to the disclosed embodiments. Method 500 will be discussed from the perspective of the battery diagnostics system 170 of FIGS. 1-3. While method 500 is discussed in combination with the battery diagnostics system 170, it should be appreciated that the method 500 is also not limited to being implemented within the battery diagnostics system 170 but is instead one example of a system that may implement the method 500.

At operation 510, the battery diagnostics system 170 (e.g., monitoring module 220) monitors, over a period of time, one or more of voltage, current or temperature signals from at least one battery 175 of the vehicle 100.

At operation 520, the battery diagnostics system 170 (e.g., monitoring module 220) stores information from the signals as time-series data 260 in the database 119.

At operation 530, the battery diagnostics system 170 (e.g., forecast module 230) obtains a forecast model 250 from the server 280. For example, the forecast module 230 can transmit a request for a forecast model 250 based on contextual parameters including one or more of the model type of the battery 175, the make/model/year of the vehicle 100, and a primary use profile of the vehicle 100 (e.g., miles driven per day, frequency of use, urban miles/highway miles ratio, etc.), environmental parameters (e.g., climate, road type, etc.), or other contextual parameters. In response to the request, the server 280 can transmit, to the battery diagnostics system 170, a forecast model 250 according to the contextual parameters of the request. The forecast module 230 can store the forecast model 250 in the database 119.

The forecast model 250 can indicate at least one shapelet feature that corresponds to a performance categorization. In one or more implementations, the forecast model 250 can indicate multiple sets of shapelet features with each set corresponding to a performance categorization.

At operation 540, the battery diagnostics system 170 (e.g., classifier module 240, forecast model 250) identifies, in the time-series data 260, a shapelet that matches the at least one shapelet feature to a degree exceeding a predetermined similarity threshold.

To identify shapelets, in one or more embodiments the classifier module 240 can scan the time-series data 260 in segments or using a sliding window, i.e., inputting data corresponding to a set length of time into the forecast model 250 to compare against each shapelet feature indicated in the forecast model 250. The classifier module 240 (e.g., the forecast model 250) can determine a match strength or similarity metric for an input segment, such as point-by-point distance between the input segment and a shapelet feature indicated in the forecast model 250. The similarity metric indicates a degree of a match between the input segment and a shapelet feature indicated in the forecast model 250. The classifier module 240 can identify segments that match a shapelet feature indicated in the forecast model 250 based on the similarity metric exceeding a similarity threshold.

At operation 550, the battery diagnostics system 170 (e.g., classifier module 240, forecast model 250) can determine a forecast for the battery 175 based on the shapelet features identified in the time-series data 260. In one or more embodiments the classifier module 240 (e.g., the forecast model 250) can determine a forecast performance categorization based on one or more metrics derived from the time-series data 260, such as frequency of occurrence of model shapelet features, co-occurrence of model shapelet features, and time distance between model shapelet features, as well as a confidence level of the forecast. For example, in one implementation the forecast model 250 may predict with 90% confidence that the battery 175 is suitable for a second life stationary storage application based on detecting a repeated co-occurrence of shapelet 410 and shapelet 420 (FIG. 4) X times in voltage signals represented in the time-series data 260. In making this prediction, forecast model 250 can use a rule-based decision process and/or a supervised machine learning algorithm (linear regression, logistic regression, neural network, gaussian process, random forest, and so on), depending on how it was trained in model builder module 355 (FIG. 3).

At operation 560, the battery diagnostics system 170 (e.g., classifier module 240) provides a notification indicating the corresponding forecast performance categorization. For example, in one or more embodiments the classifier module 240 can transmit a message to a user interface of the vehicle 100 which causes a display device to present the forecasted performance categorization information to the user, e.g., accessible in a maintenance menu of the vehicle 100 user interface settings. The process ends at 570 and may repeat periodically to update the forecast.

Accordingly, the disclosed battery diagnostics system 170 can continuously diagnose the battery 175 of the vehicle 100 to forecast future performance capabilities of the battery 175, such as second life application possibilities, as well as detect potential future problems due to latent anomalous traits or behavior.

Figure 6:
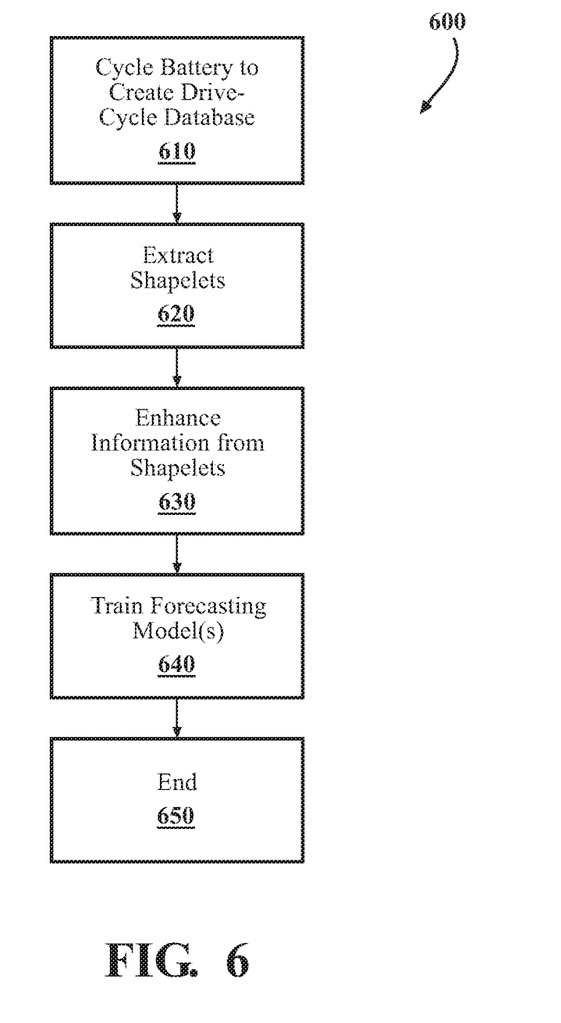
FIG. 6 illustrates a method of creating a forecast model according to the disclosed subject matter.

FIG. 6 illustrates a flowchart of a method 600 of creating a forecast model according to the disclosed embodiments. Method 600 will be discussed from the lab-based phases 301, 302 of FIG. 3. While method 600 is discussed in combination with the overall system implementing the lab-based phases 301, 302, it should be appreciated that the method 600 is also not limited to being implemented within such a system, which is merely one example of a system that may implement the method 600.

At operation 610, drive cycle equipment 310 is used to create a drive-cycle dataset (e.g., stored in lab database 320) of one or more of voltage, current or temperature values by cycling a plurality of batteries (e.g., battery 305) to a failure state or other predefined performance capability level under a plurality of conditions. Voltage, current and/or temperature signals are read from the plurality of batteries during the cycling process and stored as time-series data to form the drive-cycle dataset.

At operation 620, the shapelet extraction module 330 extracts, from the drive-cycle dataset, a plurality of shapelets that are informative of the associated signals and final result of the battery 305. In one or more embodiments, the shapelet extraction module 330 can use information gain metrics to search and find the N best shapelets that can classify input segments from the time-series data into two or more classes. For example, referring to FIG. 4, the shapelet extraction module 330 can determine that shapelet 410 is most informative of the time-series voltage signal for association with the result of the battery 305 being suitable for a second life application after reaching the performance failure state. In this manner the shapelet extraction module 330 can extract a plurality of shapelets that are associated or correlated with battery cells that exhibit one or more predetermined life-cycle capacity retention traits.

In one or more embodiments, the shapelet extraction module 330 can further receive unlabeled time-series data (i.e., field data) from participating vehicles that are currently in operation to obtain a wider array of extracted shapelets.

At operation 630, the feature creation module 335 enhances information derived from the plurality of shapelets to create a plurality of features. The features can be based, for example, on correlation across different signal types (e.g., voltage, temperature, or current), distance, frequency, and/or co-occurrence of extracted shapelets in a time segment of the time-series data.

At operation 640, the model builder module 355 aggregates the enhanced features and uses them to train a forecast model to receive time-series data as input and forecast a performance condition for a battery that produced the input time-series data. In one or more embodiments, the training data in this phase can be exclusively the lab-data where both input and output variables are known. For example, in one or more embodiments the forecast model can be trained to output a forecast regarding whether the battery 305 will retain a threshold percentage of capacity at a future time T. As other examples, in one or more embodiments the forecast model can be trained to forecast early battery failure or second life application suitability after reaching a first performance failure level, etc. The process ends at 650.

FIG. 1, which shows various components of the vehicle 100, will now be discussed in full detail as an example environment within which the system and methods disclosed herein may operate.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g, one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, or arrangement or groups thereof that enable information/data to be presented to a vehicle passenger (e.g., a person, a vehicle passenger, etc.). The output system 135 can function as part of an interface that can present, for example, forecast notifications as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the battery diagnostics system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s) and determine current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle battery diagnostics system for a vehicle, comprising:
   a communication device configured to wirelessly transmit data to a server and receive data from the server;
   one or more processors; and
   a memory communicably coupled to the one or more processors and storing:
      a monitoring module including instructions that when executed by the one or more processors cause the one or more processors to monitor, over a period of time, one or more of voltage, current or temperature signals from at least one battery of the vehicle and store information from the voltage, current or temperature signals as time-series data;
      a forecast module including instructions that when executed by the one or more processors cause the one or more processors to obtain a forecast model from the server, the forecast model indicating at least one shapelet feature that corresponds to a forecast categorization, the forecast categorization indicating a suitability of the battery for a second life application, the second life application being as an energy source for a device different from the vehicle, wherein the forecast model is trained to classify the battery using a drive-cycle dataset associated with failure of a similar battery under a plurality of conditions, the plurality of conditions determined by a closed-loop iterative process that adjusts condition profiles to diversify extracted shapelets, the shapelets being associated with battery cells that exhibit one or more predetermined life-cycle capacity retention traits; and a classifier module including instructions that when executed by the one or more processors cause the one or more processors to identify, in the time-series data, a shapelet that matches the at least one shapelet feature to a degree exceeding a predetermined similarity threshold, and to provide a notification indicating the forecast categorization.

2. The vehicle battery diagnostics system of claim 1, wherein the forecast categorization further indicates one or more of: an anomalous behavior of the battery or a projection of an amount of performance capacity the battery would retain at a future time T.

3. The vehicle battery diagnostics system of claim 1, wherein the at least one shapelet feature is derived from a voltage or current signal, the forecast model configured to predict a temperature of the battery from the at least one shapelet feature, and the classifier module further includes instructions to:

compare a present temperature of the battery detected when the shapelet that matches the at least one shapelet feature is identified; and determine that the battery exhibits anomalous behavior when the present temperature differs from the temperature that was predicted by a threshold amount.

4. The vehicle battery diagnostics system of claim 1, wherein the forecast model is trained to classify the battery based on training data obtained from emulating driving conditions for a plurality of batteries identical or similar to the at least one battery of the vehicle.

5. The vehicle battery diagnostics system of claim 4, wherein the forecast model is trained by:

creating the drive-cycle dataset, the drive-cycle dataset being of one or more of voltage, current or temperature values by using cycler equipment to cycle the plurality of batteries to failure under the plurality of conditions;

extracting, from the drive-cycle dataset, the shapelets;

enhancing information derived from the plurality of shapelets to create a plurality of features; and training the forecast model based on the plurality of features to forecast, based on input time-series data, whether the battery will retain a threshold percentage of capacity at a future time T.

6. The vehicle battery diagnostics system of claim 5, wherein the plurality of conditions are determined by a drive-cycle profile generator that generates the condition profiles in the closed-loop iterative process that receives the extracted shapelets as input and adjusts the condition profiles to diversify the extracted shapelets.

7. The vehicle battery diagnostics system of claim 5, wherein the plurality of features are created by one or more of:

identifying a minimal distance of shapelets to a given segment of a timeseries;

identifying correlative features of shapelets across different signal types; or identifying shapelet co-occurrence in a time segment of the time-series data.

8. A method of diagnosing a battery for a vehicle, comprising:

monitoring, over a period of time, one or more of voltage, current or temperature signals from the battery of the vehicle;

storing information from the voltage, current or temperature signals as time-series data;

obtaining a forecast model from a server, the forecast model indicating at least one shapelet feature that corresponds to a forecast categorization, the forecast categorization indicating a suitability of the battery for a second life application, the second life application being as an energy source for a device different from the vehicle, wherein the forecast model is trained to classify the battery using a drive-cycle dataset associated with failure of a similar battery under a plurality of conditions, the plurality of conditions determined by a closed-loop iterative process that adjusts condition profiles to diversify extracted shapelets, the shapelets being associated with battery cells that exhibit one or more predetermined life-cycle capacity retention traits;

identifying, in the time-series data, a shapelet that matches the at least one shapelet feature to a degree exceeding a predetermined similarity threshold; and providing a notification indicating the forecast categorization.

9. The method of claim 8, wherein the forecast categorization further indicates one or more of: an anomalous behavior of the battery or a projection of an amount of performance capacity the battery would retain at a future time T.

10. The method of claim 8, wherein the at least one shapelet feature is derived from a voltage or current signal and the forecast model predicts a temperature of the battery from the at least one shapelet feature, the method further comprising:

comparing a present temperature of the battery detected when the shapelet that matches the at least one shapelet feature is identified; and determining that the battery exhibits anomalous behavior when the present temperature differs from the temperature that was predicted by a threshold amount.

11. The method of claim 8, wherein the forecast model is trained to classify the battery based on training data obtained from emulating driving conditions for a plurality of batteries identical or similar to the battery of the vehicle.

12. The method of claim 11, wherein the forecast model is trained by:

creating the drive-cycle dataset, the drive-cycle dataset being of one or more of voltage, current or temperature values by using cycler equipment to cycle the plurality of batteries to failure under the plurality of conditions;

extracting, from the drive-cycle dataset, the shapelets;

enhancing information derived from the plurality of shapelets to create a plurality of features; and training the forecast model based on the plurality of features to forecast, based on input time-series data, whether the battery will retain a threshold percentage of capacity at a future time T.

13. The method of claim 12, wherein the plurality of conditions are determined by a drive-cycle profile generator that generates the condition profiles in the closed-loop iterative process that receives the extracted shapelets as input and adjusts the condition profiles to diversify the extracted shapelets.

14. The method of claim 12, wherein the plurality of features are created by one or more of:

identifying a minimal distance of shapelets to a given segment of a timeseries;

identifying correlative features across different signal types; or identifying shapelet co-occurrence in a time segment of the time-series data.

15. A non-transitory computer-readable medium for diagnosing a battery for a vehicle, including instructions that, when executed by one or more processors, cause the one or more processors to:
- monitor, over a period of time, one or more of voltage, current or temperature signals from the battery of the vehicle;
- store information from the signals as time-series data;
- obtain a forecast model from a server, the forecast model indicating at least one shapelet feature that corresponds to a forecast categorization, the forecast categorization indicating a suitability of the battery for a second life application, the second life application being as an energy source for a device different from the vehicle, wherein the forecast model is trained to classify the battery using a drive-cycle dataset associated with failure of a similar battery under a plurality of conditions, the plurality of conditions determined by a closed-loop iterative process that adjusts condition profiles to diversify extracted shapelets, the shapelets being associated with battery cells that exhibit one or more predetermined life-cycle capacity retention traits;
- identify, in the time-series data, a shapelet that matches the at least one shapelet feature to a degree exceeding a predetermined similarity threshold; and
- provide a notification indicating a prediction of the corresponding forecast categorization.

16. The non-transitory computer-readable medium of claim 15, wherein the forecast categorization further indicates one or more of: an anomalous behavior of the battery or a projection of an amount of performance capacity the battery would retain at a future time T.

17. The non-transitory computer-readable medium of claim 15, wherein the at least one shapelet feature is derived from a voltage or current signal and the forecast model predicts a temperature of the battery from the at least one shapelet feature, further comprising instructions to:
- compare a present temperature of the battery detected when the shapelet that matches the at least one shapelet feature is identified; and
- determine that the battery exhibits anomalous behavior when the present temperature differs from the temperature that was predicted by a threshold amount.

18. The non-transitory computer-readable medium of claim 15, wherein the forecast model is trained to classify the battery based on training data obtained from emulating driving conditions for a plurality of batteries identical or similar to the battery of the vehicle.

19. The non-transitory computer-readable medium of claim 18, wherein the forecast model is trained by:
- creating the drive-cycle dataset, the drive-cycle dataset being of one or more of voltage, current or temperature values by using cycler equipment to cycle the plurality of batteries to failure under the plurality of conditions;
- extracting, from the drive-cycle dataset, the shapelets;
- enhancing information derived from the plurality of shapelets to create a plurality of features; and
- training the forecast model based on the plurality of features to predict, based on input time-series data, whether the battery will retain a threshold percentage of capacity at a future time T.

20. The non-transitory computer-readable medium of claim 19, wherein the plurality of conditions are determined by a drive-cycle profile generator that generates the condition profiles in the closed-loop iterative process that receives the extracted shapelets as input and adjusts the condition profiles to diversify the extracted shapelets.

* * * * *